United States Patent Office 3,480,331
Patented Nov. 25, 1969

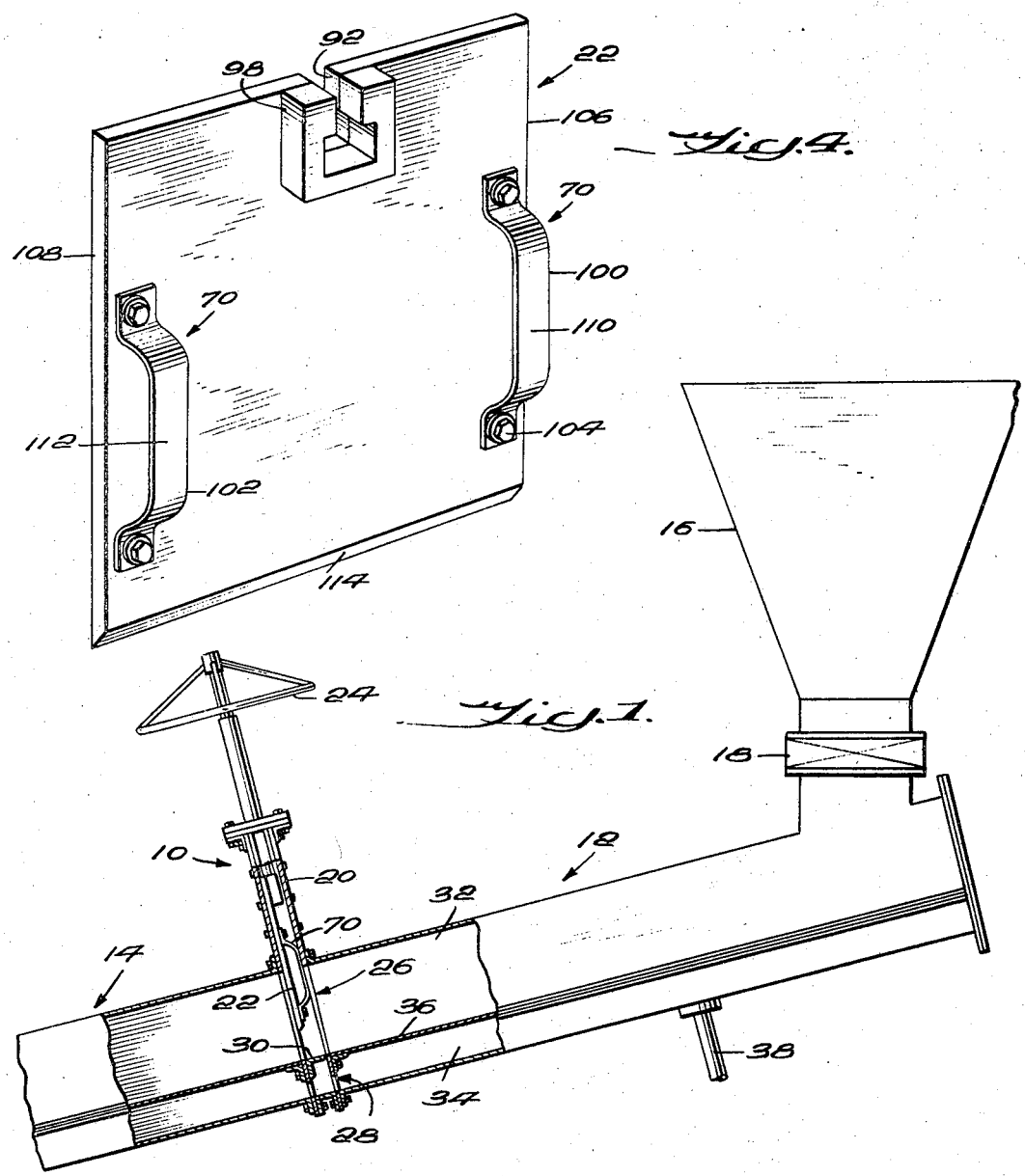

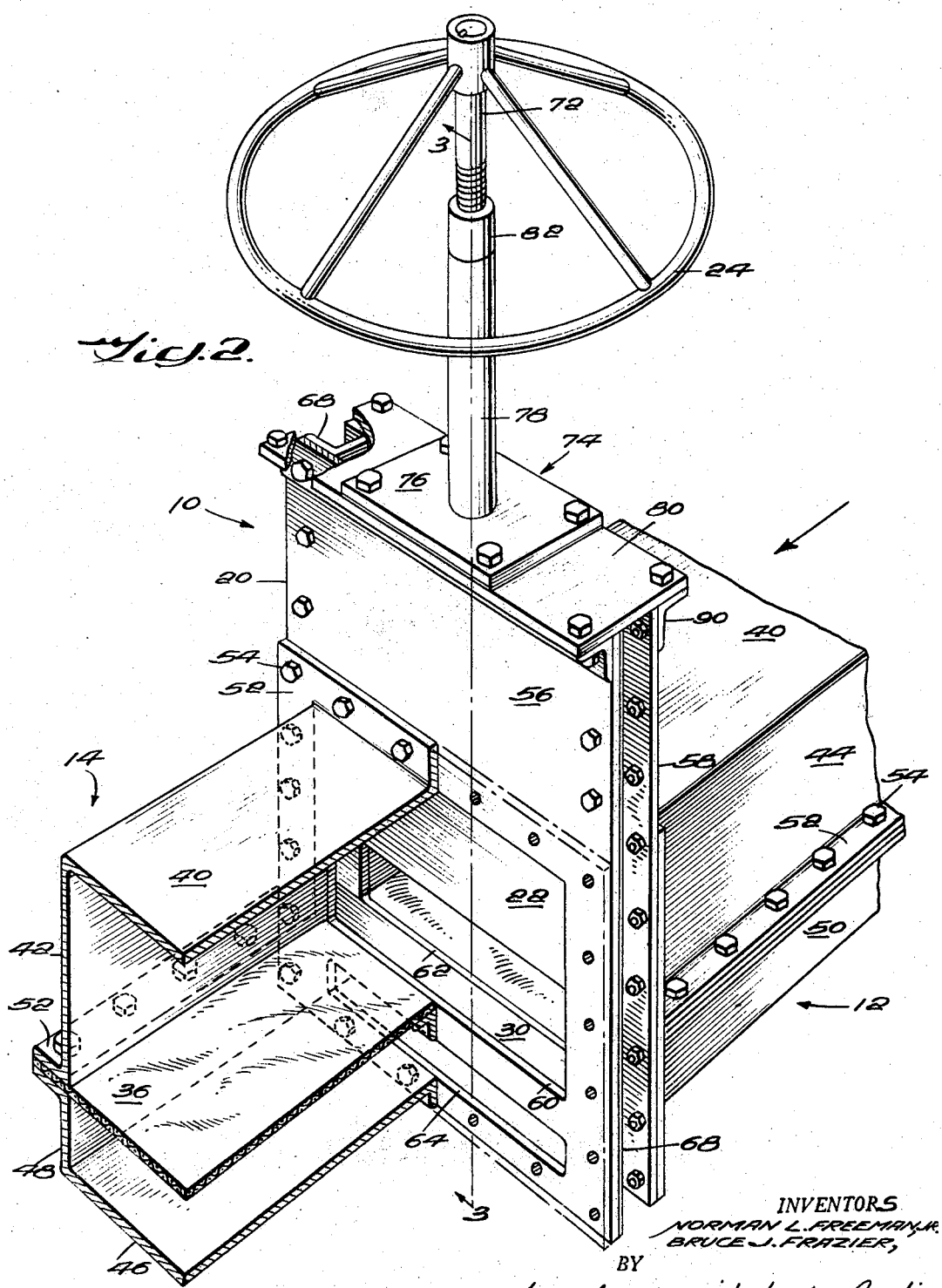

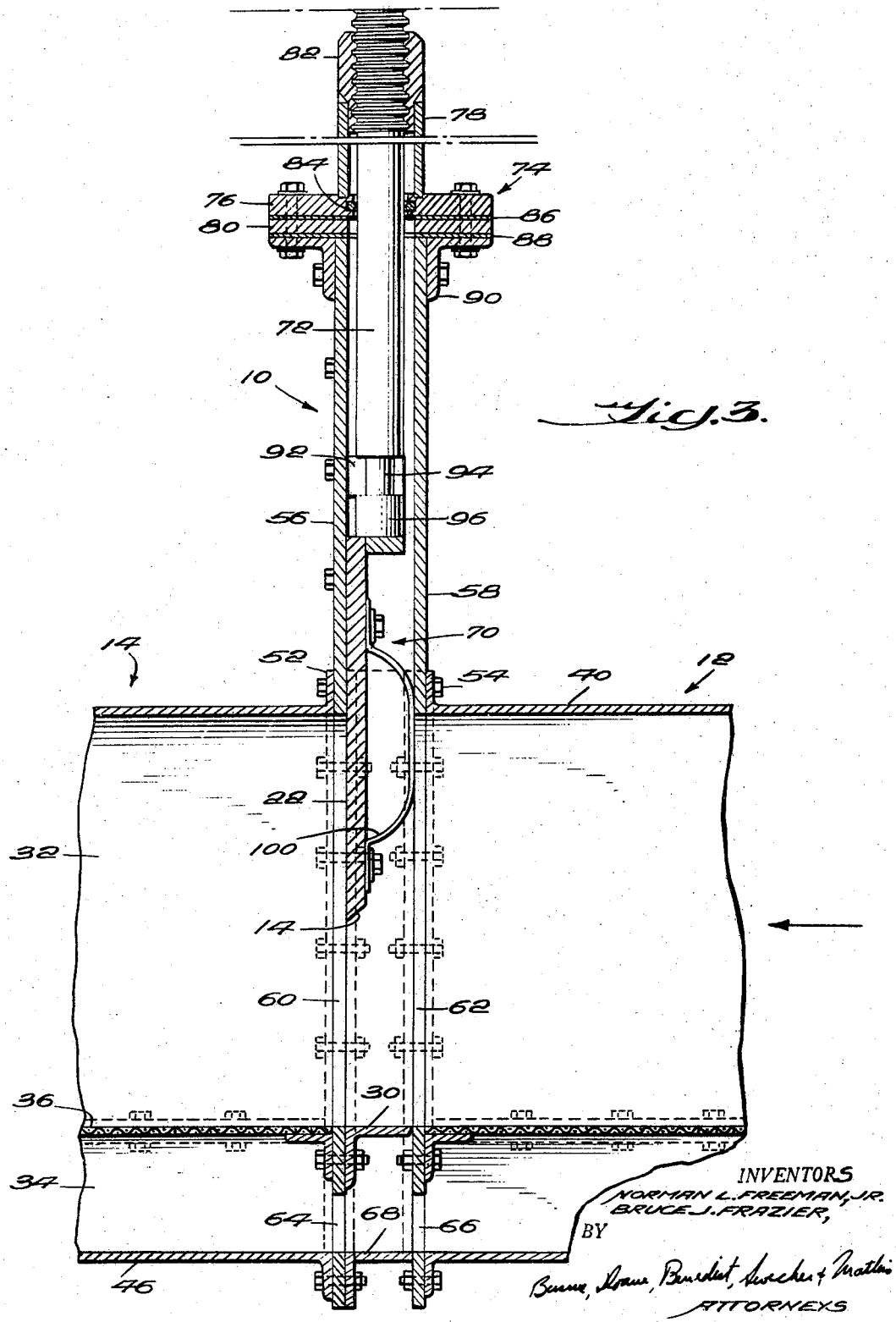

3,480,331
FLUIDIZING CONVEYOR APPARATUS
Norman L. Freeman, Jr., and Bruce J. Frazier, Duncan, Okla., assignors to Halliburton Company, Duncan, Okla., a corporation of Delaware
Continuation of application Ser. No. 594,831, Nov. 16, 1966. This application Apr. 3, 1968, Ser. No. 718,634
Int. Cl. B65g 53/18, 53/46
U.S. Cl. 302—29          4 Claims

ABSTRACT OF THE DISCLOSURE

A conveyor system having a gate valve for metering the flow of fluidized material along a conveyor. The fluidized conveyor has a transverse partition which extends longitudinally of an enclosed conveyor section. The partition is gas permeable and divides the interior of the conveyor section into a material conveying chamber above the partition and a gas chamber or plenum below the partition. Gas flows through the plenum chamber from one end to the other of the conveyor section, and since the partition is gas permeable, the gas flows upwardly through the partition with sufficient velocity to cause the pulverulent material to become fluidized. The conveyor is usually arranged in a sloping position so that the fluidized material flows from the upper end to the lower end of the conveyor section. A gate valve is provided between adjacent ends of two conveyor sections for metering the flow of fluidized material along the conveyor. The valve includes a continuous passage that is aligned with the plenum chamber of each conveyor section, and a material conveying passage which is aligned with the material conveying chamber of each conveyor section. The gate valve is very thin and has a blade which moves vertically to adjust the size of the passage through which the fluidized material flows. Resilient springs on the blade urge the plate against the valve seat to minimize leakage of material between the edges of the valve plate and the seat. A rigid non-permeable plate separates the gas passage from the fluidized material passage in the gate valve assembly and forms a rigid stop for the gate valve blade when it is closed.

---

This is a continuation of Ser. No. 594,831 filed Nov. 16, 1966, now abandoned.

This invention relates to apparatus for conveying fluidized pulverulent material and, more particularly, to a gate valve for metering the flow of fluidized material along such conveying apparatus.

Fluidizing conveyors make possible the transfer of substantially dry, finely divided or pulverulent bulk materials without the use of moving mechanical parts. Typically, these conveyors include a generally horizontally disposed conduit having a material inlet at one end and a material outlet at the other end. The conduit usually has a rectangular cross section and includes a gas-permeable sheet material or aeration medium extending longitudinally through the conduit which divides the conduit into a pulverulent material conveying chamber above the sheet material and a gas chamber or plenum below the sheet material.

A gas, usually air, is introduced into the plenum chamber and passes upwardly through the aeration medium to fluidize the pulverulent material in the upper chamber. The fluidized material flows through the conduit over the aeration medium by gravity since the conduit is usually inclined or slopes downwardly from the inlet to the outlet by a small angle. This slope is equal to or slightly greater than the angle of repose of the material being conveyed and varies between about 4 to 15 degrees from the horizontal.

In order to meter the flow of the fluidized material along the conveyor, valves are usually installed across the flow path of the pulverulent material. One type of valve is relatively thick in order to provide the required housing for the movable valve member. The thickness of the valve interferes with the flow of aerated material along the conduit from one side of the valve to the other, and in passing through the valve, the material has a tendency to build up around the valve element. To overcome the material buildup in the valve, aeration medium is provided in the valve housing. This construction, however, results in a valve that is cumbersome to handle and install due to its size, and has a relatively high cost because of the presence of the aeration medium.

Another type of metering valve comprises a generally vertically movable blade member mounted in a conduit section above the aeration medium. With this arrangement, a complete conduit section with the valve must be installed in the conveyor, or the existing conveyor must be modified to include the blade and associated valve structure.

One problem which is associated with these valves is that the lower edge of the valve member or blade contacts the upper surface of the aeration medium when the valve is completely closed. This contact, after repeated operation of the valve to cut off flow of material, tends to damage and wear away the aeration medium. In addition, the upper surface of the aeration medium ordinarily does not provide a proper seat for the blade to effectively close and seal the passage and therefore some leakage past the valve is experienced.

Another common problem with these valves is that the valves depend on the force of the fluidized material to hold the blade against its seat to prevent leakage of material past the valve blade. This has been found to be a generally unsatisfactory arrangement, since under medium or low material flow rates, the force on the blade may not be sufficient to maintain a good seal between the blade and its seat and thus leakage occurs.

Accordingly, it is a primary object of the present invention to provide an improved valve for metering the flow of fluidized material along a fluidizing conveyor.

Another object of the present invention is to provide a gate valve for metering the flow of aerated pulverulent material along a fluidizing conveyor wherein an effective seal is maintained between the valve member and its seat to prevent leakage of material past the valve for all settings of the valve.

A further object of the instant invention is to provide a gate valve for metering the flow of aerated, finely divided bulk material along a pneumatic conveyor which is rugged, easy to handle, and is adapted to be conveniently installed between a pair of conveyor sections.

In accordance with a preferred embodiment of the invention, the foregoing objects are attained by providing within a fluidizing conveyor, an individual gate valve assembly that is installed between sections of the conveyor for controlling the flow of fluidized pulverulent material therealong. The valve comprises a valve body having an upper material flow passage and lower gas passage separated from each other by a rigid impervious wall. A gate member in the form of a thin flat plate or blade is slidably mounted within the body for substantially vertical movement therein. The blade is provided with springs secured to the upstream side thereof which are adapted to cooperate with portions of the valve body to hold the blade against its seat.

The valve blade may be raised and lowered by turning a screw shaft that is connected with the valve blade. The screw shaft permits accurate adjustment of the blade with a minimum of effort.

This preferred embodiment is illustrated in the annexed drawings in which:

FIGURE 1 is a side elevational view of part of a conveyor system for transferring fluidized bulk material which includes the gate valve according to the invention;

FIGURE 2 is an enlarged perspective view, in partial section, of the gate valve of FIGURE 1, installed between two sections of a fluidizing conveyor;

FIGURE 3 is a cross-sectional view of the valve and conveyor of FIGURE 2 along the lines 3—3; and FIGURE 4 is a perspective view of the gate blade of the valve according to the invention.

Referring to FIGURE 1, there is shown a thin gate valve, generally indicated by the numeral 10, installed between a pair of matching sections 12 and 14 of a fluidizing conveyor for the purpose of metering the flow of pulverulent bulk material therealong. The fluidizing conveyor may be utilized as in the system shown to transfer finely divided bulk material such as cement from a tank 16 to a collection bin or the like (not shown).

To accomplish this transfer, the material may be permitted to drop through a suitable valve 18 connected to the bottom of the tank 16 and into the conveyor section 12, whereupon the material will be aerated or fluidized. Gravity will then cause the fluidized material to flow along the inclined conveyor sections 12 and 14 to its destination. The rate of material flow along the conveyor is controlled by the gate valve 10 which comprises a body 20 and which includes a slidable blade 22, actuated by turning a hand wheel 24, to vary the size of an upper material flow passage 26 formed thru the body 20. A lower gas flow passage 28 is also formed thru the body 20 and is separated from the upper passage 26 by a solid wall member 30.

The conveyor sections 12 and 14 each comprise a generally rectangular casing of an impervious material such as sheet metal, and comprise an upper chamber 32 for the pulverulent material and a lower chamber or a plenum 34 for the fluidizing gas. A gas-permeable member or an aeration medium 36 extends longitudinally of the conveyor separating the upper chamber 32 from the plenum 34 and forms the bottom of the upper chamber over which the bulk material moves. The gas, usually air, is supplied under low pressure to the plenum 34 by means of a pipe 38 and flows upwardly thru the medium 36 to fluidize the bulk material.

Turning now to FIGURES 2 and 3, the upper material flow chamber 32 of each of the conveyor sections 12 and 14 is formed by a top wall 40 and a pair of parallel, downwardly extending side walls 42 and 44. The plenum 34 of each section is formed by a bottom wall 46 and a pair of upwardly extending parallel side walls 48 and 50. In order to join the various parts of the conveyor sections together and to the body 20 of the valve 10, all of the walls of the sections may be provided with laterally extending matching flanges 52. The flanges are ordinarily predrilled to receive suitable fasteners such as the bolts 54.

The aeration medium 36 may be secured in its proper position by clamping it between the flanges 52 of the upper and lower portions of the casing, or it may be attached separately to either one if desired. The aeration medium 36 may comprise any suitable gas-permeable sheet material such as multi-ply canvas, porous plastic, asbestos sandwiched between metal wire screening and sintered bronze, or the like depending on the type of pulverulent material being conveyed.

The gate valve 10 is secured between the downstream end of the conveyor section 12 and the upstream end of the conveyor section 14 corresponding with the direction of the material flow as indicated by the arrow shown in FIGURES 2 and 3. The body 20 of the valve includes a pair of flat rectangular plates 56 and 58 of substantially equal size, each having formed therein a pair of matching upper and lower openings 60, 62, and 64, 66, respectively. Openings 60 and 62 form the upper material flow passage 26 and openings 64 and 66 form the lower gas flow passage 28. These openings preferably have dimensions which correspond approximately with the inside dimensions of the material flow chamber 32 and the plenum chamber 34 of the conveyor sections. The plates 56 and 58 are conveniently held in a spaced-apart, parallel, face-to-face relation by means of a plurality of angle members 68, which also form the sidewalls and the bottom walls of the passages 26 and 28. The plates and angle members which are usually steel, may be joined together by continuous welds so as to maintain an airtight construction.

The blade 22, which is described more fully below, is slidable vertically along the inner surface of the body plate 56 across the opening 60 therein, and is held firmly against the plate by spring means 70 secured to the upstream surface of the blade 22. The blade 22 is actuated by a shaft 72 attached to the upper portion thereof which extends into the valve body 20 between the plates 56 and 58 through a bonnet assembly 74. The bonnet assembly comprises an upper bonnet plate 76 having an upwardly extending tube 78, and a lower bonnet plate 80. Tube 78 may be provided at its upper end with a rigidly attached adjusting nut 82 to cooperate with a threaded portion of the shaft 72 to provide a means for axially moving the shaft upon rotation thereof. The shaft may be rotated by turning the hand wheel 24, which is keyed to the upper end of the shaft.

The bonnet assembly 74 includes a packing gland to prevent the escape of fluidized material along the shaft 72 which comprises an O-ring 84, received within an annular groove formed in the upper bonnet plate 76, and a pair of sealing gaskets 86 and 88. The gasket 86 is held between the bonnet plates 76 and 80 and the gasket 88 is held between the bonnet plate 80 and a pair of angle members 90 secured along the top of the valve body 20.

The connection provided between the rotatable shaft 72 and the slidable gate blade 22, shown more clearly in FIGURE 4, comprises an inverted T-shaped slot 92 formed in the top edge portion of the blade which is adapted to receive the lower end of the shaft 72. The lower end of the shaft has been reduced in diameter at 94 inwardly of the end, thereby leaving a cylindrical head portion 96. A rectangular block member 98 having a matching T-slot formed therein is welded or otherwise secured to the upstream surface of blade 22 so as to provide extra bearing surfaces for the corresponding bearing surfaces of the lower end of the shaft.

One of the particularly novel features of the present invention resides in the spring means 70 for holding the blade 22 against its seat formed by the inner or upstream surface of the plate 56 adjacent the periphery of opening 60 independently of the force exerted by the fluidized material which flows through the valve. As can be seen in FIGURES 3 and 4, the spring means 70 comprises a pair of substantially U-shaped flat strips 100 and 102, of resilient material such as spring steel, which are secured to the blade 22 on the upstream surface thereof by means of cap screws 104 or the like. The springs 100, 102 are positioned on the gate blade closely adjacent and substantially parallel to side edges 106 and 108 respectively.

In this fashion, the springs will slide along flattened areas 110 and 112 and bear against portions of the inner surface of upstream valve body plate 58 outwardly of the vertically disposed edges of opening 62 formed therein.

From an inspection of FIGURES 2 and 3, it will be appreciated by those skilled in the art that vertical channels or guideways for the blade 22 are formed by the inner surfaces of the side walls of the valve body 20 and the oppositely disposed portions of the inner surfaces of body plates 56 and 58 between the vertical peripheral edges of openings 60 and 62 and the side walls. As a result of the placement of the springs 100 and 102 on the upstream surface of the blade 22 closely adjacent its vertical edges, the surfaces 110 and 112 of the springs will slidably engage the inner surface of plate 58 throughout the movement of the blade 22.

As mentioned above, one of the angle members 68 forms the bottom 30 of the material flow passage 26 through the valve body and is fabricated of steel as are the other angles, plates, etc., of the valve 10. Thus, the lower horizontal edge of blade 22, which is beveled as at 114, will contact the upper surface of angle member 68 when the valve is completely closed. By this arrangement, repeated closing of the valve even over a long period of time will have little or no effect on reducing the sealing qualities of the valve in the closed position. Nor will there be concern over harmful wear on the bottom of the material floor passage which is sometimes encountered with prior art valves of the type which employ aeration medium for the bottom of the floor passage.

As an alternative to the hand wheel and shaft arrangement for adjusting the position of the blade 22 with respect to the bottom of the flow passage 26, a fluid operated piston and cylinder construction may be utilized. In such a construction, the piston rod itself may be directly conected to the upper end of valve blade 22 by a suitable rigid connection.

To cite an example of the extreme thinness of valve 10, a valve constructed according to this invention having an overall depth or thickness of only 2¼ inches has been used to meter the flow of fluidized bulk material along a 14 inch conveyor having a capacity of approximately 6,000 cubic feet per hour. This is in sharp contrast to a comparable prior art valve used to meter the same flow along this conveyor which has a depth of about 14 inches and therefore requires the use of aeration medium as the floor of the material flow passage.

In typical installations, the casing sections are fabricated of 12 or 14 gauge steel and are usually provided with ¼ inch steel flanges for connection purposes. Therefore, as shown, valve 10 is fabricated from steel plates, angle irons and the various elements are bolted and welded together. The various joints between the conduit sections, valve body, etc., may be sealed with waterproof compounds, caulking or any suitable sealing material to prevent the escape of air and fluidized bulk material. Of course, other suitable materials may be utilized to construct valve 10 and various parts thereof depending on the particular requirements of the system as will be obvious to those skilled in the art.

The gate valve of the present invention provides a relatively inexpensive, yet efficient, rugged and highly reliable metering valve for fluidizing conveyor systems.

By utilizing the springs 100 and 102 secured to the gate blade 22, the blade is constantly held tightly in sealing relationship with its seat during all positions thereof even when the force available from the weight of the fluidized material is insufficient to prevent leakage past the valve.

Furthermore, during downward movement, the spring-loaded blade operates to scrape away pulverulent material which tends to collect in the guideways and build up around the opening 60 in plate 56. The biased scraping action acts to prevent the blade from riding over such material, thereby increasing leakage past the blade. Also, it prevents the likelihood of the blade binding in the guideways.

Since the valve of the subject invention can be made very thin, it is a relatively simple matter to install the valve almost anywhere in a fluidizing conveyor system by merely separating two abutting sections of the fluidized conveyor and interposing the valve between the sections without significantly disturbing the slope of the conveyor or the mounting structure. Therefore, the gate valve described above can be installed in a fluidizing conveyor system with a minimum of time and effort thereby resulting in significant savings.

Having described the invention with respect to a preferred embodiment, it is to be understood that various modifications and alterations may be made in the construction and utilization of this invention without departing from the scope of the invention as set forth in the following claims.

We claim:

1. Apparatus for conveying substantially dry, finely divided material comprising:
   a plurality of conveyor sections, said sections having opposite side walls, a top wall and a bottom wall, each section having an upper material flow chamber provided with an inlet and an outlet for said material, and having a plenum chamber below said material flow chamber and coextensive therewith; a gas-permeable member separating said chambers in each of said sections and forming the bottom of said upper chamber; at least one of said sections having means for introducing gas under pressure into said plenum chamber; and
   a gate valve interposed between two of said conveyor sections for metering the flow of material through said upper chamber, said gate valve including a body portion having an upper material flow passage and a lower gas flow passage formed therethrough, said body portion including a pair of flat plates secured together in spaced apart, parallel, face to face relation, an impervious bottom wall and impervious side walls extending between said flat plates, said section side walls being in substantial alignment with said body portion side walls, said section bottom wall being in substantial alignment with said body portion bottom wall,
   a rigid gas-impermeable wall member extending between said side walls and said flat plates of said gate valve, said wall member being spaced from said bottom wall and being in substantial alignment with said gas-permeable member of said conveyor sections, said upper material flow passage being defined by said side walls and said wall member, said lower gas flow passage being defined by said wall members and said bottom wall and said side walls;
   valve means slidably and sealingly mounted in said body between said flat plates; and means operably connected with said valve means for progressively moving said valve means relative to said body from a fully open position to a fully closed position in which said valve means is entirely blocking said upper passage, said valve means and said wall member including opposed, mating surfaces, said surfaces being positioned in abutting, sealing contact when said valve means is moved into said fully closed position, whereby said body portion is sufficiently short in length to allow insertion of said body portion between adjacent conveyor sections without rebuilding the conveying apparatus.

2. The conveying apparatus is according to claim 1, wherein: said valve means includes a blade; spring means on said blade; said body including seat means adjacent said blade, said spring means coacting with portions of said valve body for continuously urging said blade means against said seat means.

3. The conveying apparatus set forth in claim 1, wherein: said valve means includes a blade mounted for sliding movement transverse to the direction of said material flow through said valve body; said blade is provided with spring means secured to the inlet side of said blade; said body including guide means and seat means for said blade means; said spring means coacting with said guide means for biasing said blade means against said seat, whereby an effective seal is maintained at all times between said gate blade and said seat.

4. The conveying apparatus set forth in claim 3, wherein: said spring means comprises a pair of flat U-shaped resilient strips positioned along opposite edges of said blade to be continuously in sliding engagement with the inwardly facing surface of one of said plates.

References Cited

UNITED STATES PATENTS 2,657,100   10/1953   Weller.
2,832,564   4/1958   Williams.

ANDRES H. NIELSEN, Primary Examiner